(12) United States Patent
Park et al.

(10) Patent No.: US 9,894,629 B2
(45) Date of Patent: Feb. 13, 2018

(54) TELEMATICS TERMINAL, CONTROL METHOD THEREOF, DATA CENTER, CONTROL METHOD THEREOF, AND DATA SERVICE SYSTEM

(71) Applicant: Hyundai Motor Company, Seoul (KR)

(72) Inventors: Seong Jin Park, Daejeon (KR); Seung Su Kim, Seoul (KR); Woo Sub Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/959,274

(22) Filed: Dec. 4, 2015

(65) Prior Publication Data

US 2016/0249277 A1    Aug. 25, 2016

(30) Foreign Application Priority Data

Feb. 24, 2015    (KR) .................. 10-2015-0025650

(51) Int. Cl.
| G06F 11/30 | (2006.01) |
| H04W 60/00 | (2009.01) |
| H04L 29/08 | (2006.01) |
| G01M 17/00 | (2006.01) |
| G07C 5/00  | (2006.01) |

(52) U.S. Cl.
CPC ............ H04W 60/00 (2013.01); H04L 67/00 (2013.01); H04L 67/12 (2013.01); H04L 67/16 (2013.01); *G07C 5/008* (2013.01)

(58) Field of Classification Search
CPC ......... H04W 4/00; H04W 4/02; H04W 60/00; H04W 24/02; H04W 8/245; H04W 88/02; H04L 67/00; H04L 67/12; H04L 67/16; G07C 5/008; G05B 23/00; G05B 23/0283; B60W 50/04; B60W 50/02; B60W 2050/048; B60W 2050/046; B60W 50/0225; B60G 2800/80; B60L 3/03; B60T 8/4036; B60R 16/0234; F16H 2061/1208;

(Continued)

(56) References Cited

U.S. PATENT DOCUMENTS

| 2009/0088910 A1* | 4/2009 | Yi ........................ H04L 12/12 701/1 |
| 2010/0136954 A1* | 6/2010 | Bennett, Jr. ............ H04W 4/02 455/414.1 |

(Continued)

FOREIGN PATENT DOCUMENTS

| JP | 2003-120413 A    | 4/2003 |
| KR | 10-2003-0048941 A | 6/2003 |

(Continued)

*Primary Examiner* — Huy C Ho
(74) *Attorney, Agent, or Firm* — Mintz Levin Cohn Ferris Glovsky and Popeo, P.C.; Peter F. Corless

(57) ABSTRACT

A data center includes a modem unit communicating with a telematics terminal, and a controller i) controlling the modem unit such that a service search instruction is transmitted to the telematics terminal to search for a service provided by a vehicle, ii) controlling the modem unit such that information about whether the service is to be provided is received from the telematics terminal, iii) requesting that the telematics terminal register the service when the service is to be provided, and iv) receiving the service from the telematics terminal when the request is accepted.

20 Claims, 2 Drawing Sheets

(58) Field of Classification Search
CPC ........... H04M 1/2477; H04M 1/72522; H04M 3/42178
USPC ..................................................... 455/414.3
See application file for complete search history.

(56) References Cited

U.S. PATENT DOCUMENTS

| | | |
|---|---|---|
| 2013/0079950 A1 | 3/2013 | You |
| 2013/0111582 A1 | 5/2013 | Forest |
| 2016/0163129 A1* | 6/2016 | Elnajjar ............... G07C 5/0808 701/29.6 |

FOREIGN PATENT DOCUMENTS

| | | |
|---|---|---|
| KR | 10-2008-0067789 A | 7/2008 |
| KR | 10-2009-0028925 | 3/2009 |
| KR | 10-2009-0030664 | 3/2009 |
| KR | 10-2010-0084934 A | 7/2010 |
| KR | 10-2012-0010634 | 2/2012 |
| KR | 10-1491296 B1 | 2/2015 |

* cited by examiner

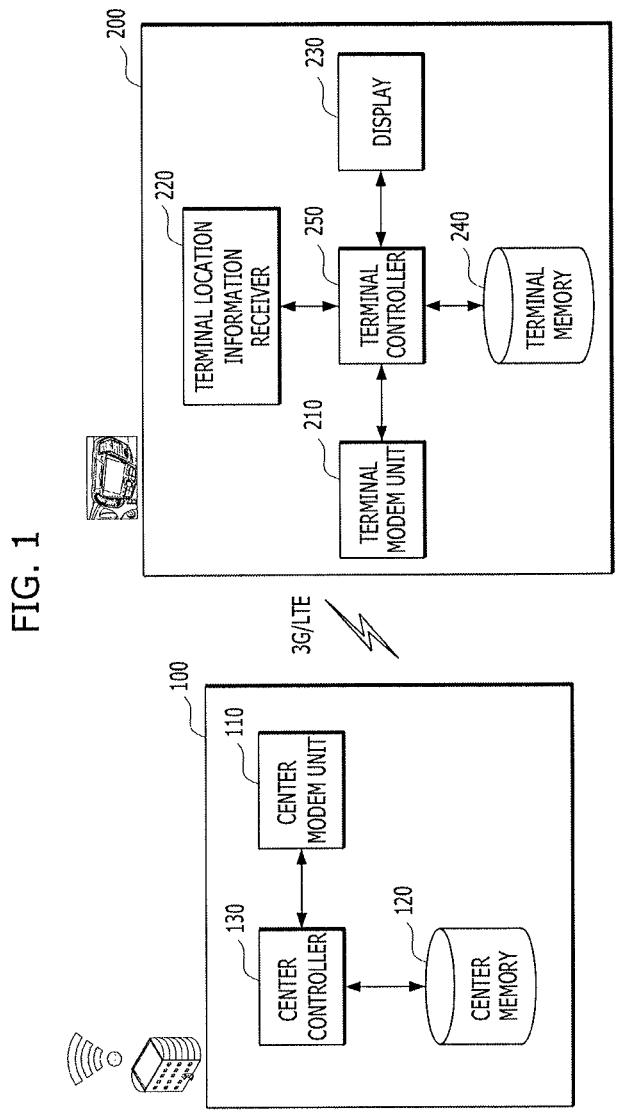

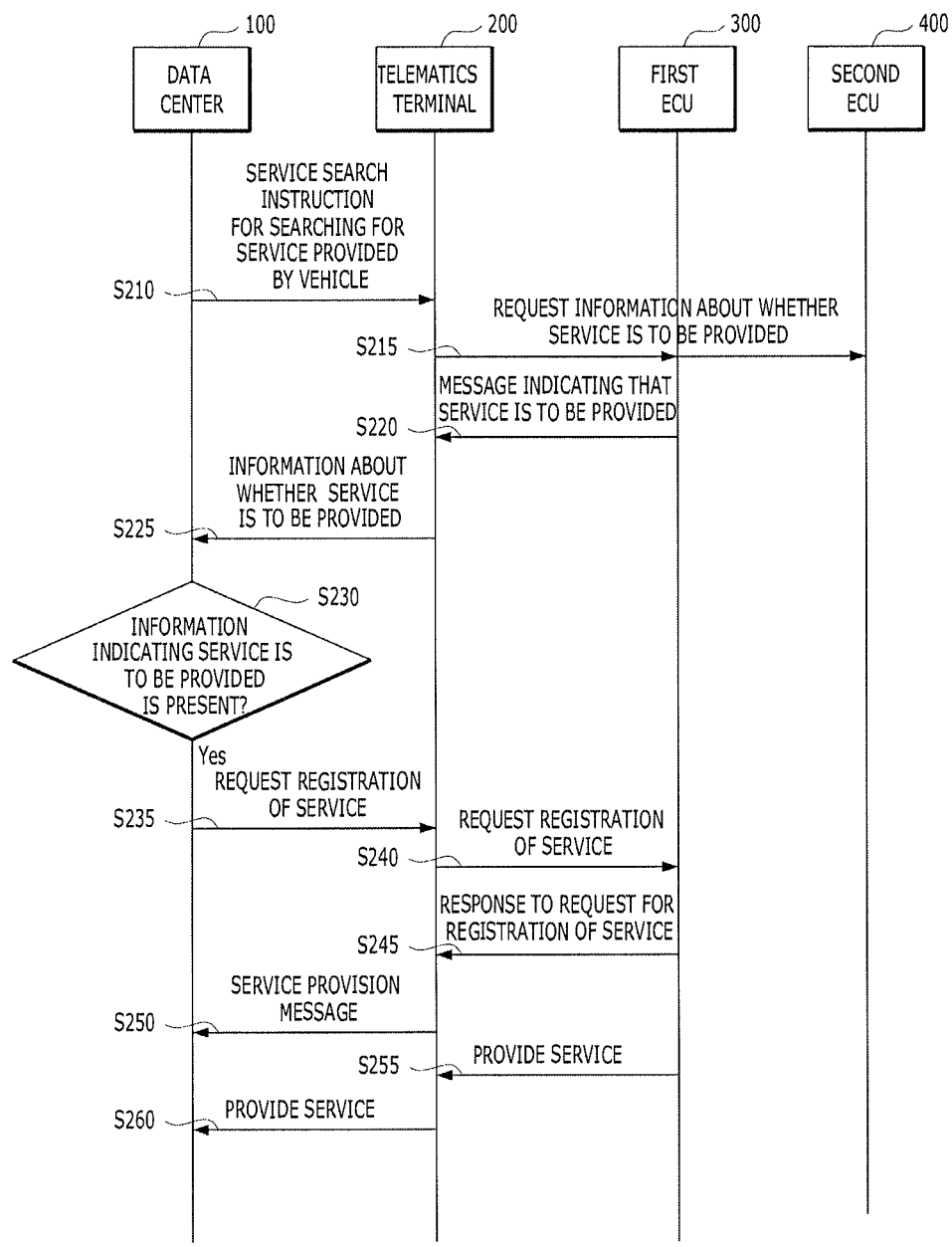

TELEMATICS TERMINAL, CONTROL METHOD THEREOF, DATA CENTER, CONTROL METHOD THEREOF, AND DATA SERVICE SYSTEM

CROSS-REFERENCE TO RELATED APPLICATION

This application claims the benefit of and priority to Korean Patent Application No. 10-2015-0025650, filed on Feb. 24, 2015, which is hereby incorporated by reference as if fully set forth herein.

BACKGROUND OF THE DISCLOSURE

Technical Field

The present disclosure relates generally to a telematics terminal, a method of controlling the telematics terminal, a data center, a method of controlling the data center, and a data service system and, more specifically, to a telematics terminal providing a data collection service, a method of controlling the telematics terminal, a data center, a method of controlling the data center, and a data service system.

Discussion of the Related Art

With rapid advances in electronic control technology, various devices, which had been operated by a mechanical scheme in a vehicle, have been driven by an electric scheme for convenience of a driver, safety of driving, etc. In addition, vehicle systems have gradually advanced and become more sophisticated. In particular, telematics technology has advanced rapidly.

Telematics is a compound word of telecommunication and informatics and refers to a system configured to achieve more convenient and safe driving by analyzing various phenomena occurring in a vehicle and collecting various information necessary for driving through a communication terminal installed in a vehicle. In general, a telematics system involves a wireless data service in which information is provided while a vehicle is travelling and which enables a user to exchange information with a computer incorporated in transportation equipment such as a vehicle, an airplane, a ship, etc. A typical telematics system may take advantage of technology for changing a character signal and an audio signal using wireless communication technology, a global positioning system (GPS), and the Internet.

A GPS and a telematics terminal having a mobile communication function need to be installed in a vehicle in order to implement a telematics service. The telematics service provides a driver with information about vehicular accidents, theft detection, driving route guidance, traffic, living, a game, etc., by applying mobile communication technology and location tracking technology to a vehicle.

Recently, a service has been introduced to collect various information of a vehicle through a link to a telematics service. Many automobile companies in addition to global technology companies have been constructing data centers in which various types of data of a vehicle can be collected. An information collection service assists in product improvement and new product development by diagnosing a breakdown and analyzing a driving habit of a driver through construction of a big data environment to detect hidden demands of customers.

However, conventional information collection services have entailed the inconvenience of changing or updating software of a component installed in a vehicle when additional vehicle data needs to be collected, while such conventional service may be efficient in collection of the initially predefined information.

SUMMARY OF THE DISCLOSURE

The present disclosure has been conceived to solve the above-mentioned problem(s), and an object of the present disclosure is to provide a telematics system for collecting variable data and enhancing dynamic extension by applying Ethernet communication to an electronic control unit (ECU) in a vehicle and applying a service discovery process to the telematics system. In addition, another object of the present disclosure is to provide a telematics terminal for providing a service without changing software of a component installed in a vehicle when an additional service is requested while another service is being provided, a data center, a method of controlling the telematics terminal, a method of controlling the data center, and a data service system.

Technical problems to be solved by the present disclosure are not limited to the above-mentioned technical problems, and other technical problems not mentioned herein may be clearly understood by those skilled in the art from description below.

To achieve these objects and other advantages and in accordance with the purpose of the disclosure, as embodied and broadly described herein, a data center includes: a modem unit communicating with a telematics terminal, and controller i) controlling the modem unit such that a service search instruction is transmitted to the telematics terminal to search for a service provided by a vehicle, ii) controlling the modem unit such that information about whether the service is to be provided is received from the telematics terminal, iii) requesting that the telematics terminal register the service when the service is to be provided, and iv) receiving the service from the telematics terminal when the request is accepted.

Furthermore, according to embodiments of the present disclosure, a method of controlling a data center for communicating with a telematics terminal includes: transmitting a service search instruction for searching for a service provided by a vehicle to the telematics terminal; receiving, from the telematics terminal, information about whether the service is to be provided; requesting that the telematics terminal register the service when the service is to be provided; and receiving the service from the telematics terminal when the request is accepted.

Furthermore, according to embodiments of the present disclosure, a method of controlling a telematics terminal includes: receiving a service search instruction from a data center to search for a service provided by a vehicle; querying at least one ECU mounted in the vehicle to determine whether the service is to be provided; and transmitting a response indicating that the service is to be provided to the data center when the response is received from the at least one ECU.

Furthermore, according to embodiments of the present disclosure, a telematics terminal includes: a modem unit for communicating with a data center; and a controller for i) receiving a service search instruction through the modem unit such that a service provided by a vehicle is searched for, ii) querying at least one ECU mounted in the vehicle to determine whether the service is to be provided, and iii) transmitting a response indicating that the service is to be provided to the data center when the response is received from one of the at least one ECU.

Furthermore, according to embodiments of the present disclosure, a data service system includes: a telematics terminal; at least one ECU mounted in a vehicle communicating with the telematics terminal; and a data center transmitting, to the telematics terminal, a service search instruction for searching for a service provided by the vehicle. The telematics terminal queries the at least one ECU to determine whether the service is to be provided, and transmits a response indicating that the service is to be provided to the data center when the response is received from one of the at least one ECU, and the data center requests via the telematics terminal that the ECU capable of providing the service register the service when the response indicating that the service is to be provided is received, and receives the service from the ECU capable of providing the service via the telematics terminal when the request is accepted by the ECU capable of providing the service.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 is a block diagram illustrating a telematics terminal and a data center according to embodiments of the present disclosure; and FIG. 2 is a sequence diagram illustrating a service discovery operation of a data service system according to embodiments of the present disclosure.

DETAILED DESCRIPTION OF THE DISCLOSURE

Hereinafter, embodiments disclosed in the specification will be described in detail with reference to the accompanying drawings. The same or similar reference numerals will be used to refer to the same or similar components, and repeated description thereof will be omitted. It is to be noted that the suffixes of components used in the following description, such as "module" and "unit", are simply used considering the ease of writing the specification or used interchangeably, and do not have any particular importance or role.

In addition, if a detailed description of associated related art may obscure subject matter of an exemplary embodiment disclosed in the specification when the exemplary embodiment disclosed in the specification is described, the detailed description is omitted. In addition, the accompanying drawings merely aid in understanding of the embodiments disclosed in the specification, and do not restrict the technical scope of the specification. Further, it should be understood that the present disclosure covers all modifications, equivalents or substitutes that come within the spirit and the scope of the present disclosure.

Although terms including ordinal numbers such as first, second, etc., may be used to describe various components, the components are not limited by the terms. The terms are used only to distinguish one component from another. When a component is mentioned as being "connected" to or "accessing" another component, this may mean that it is directly connected to or accesses the other component, but it is to be understood that another component may be present therebetween. On the other hand, when a component is mentioned as being "directly connected" to or "directly accessing" another component, it is to be understood that there are no other components therebetween. Singular forms are intended to include the plural forms as well, unless context clearly indicates otherwise.

It will be further understood that terms such as "including" or "having," etc., are intended to indicate the presence of the features, numbers, operations, actions, components, parts, or combinations thereof disclosed in the specification, and are not intended to preclude the possibility that one or more other features, numbers, operations, actions, components, parts, or combinations thereof may be present or may be added.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Prior to a description of methods of controlling a telematics terminal and a data center, components of the telematics terminal and the data center will be described. A description will be given on the assumption that the data center includes a telematics center that collects vehicle data including breakdown information, driving information, etc. of a vehicle.

FIG. 1 illustrates a telematics terminal 200 and a data center 100 according to embodiments of the present disclosure.

As shown in FIG. 1, the data center 100 may provide various services to the telematics terminal 200. For example, the data center 100 may provide the telematics terminal 200 with information about a vehicular accident, theft detection, driving route guidance, traffic, living, a game, etc. In addition, the data center 100 may receive a service from the telematics terminal 200. The data center 100 may receive a service for collecting various information of a vehicle from the telematics terminal 200.

Hereinafter, a description will be focused on the data center 100 receiving a service from the telematics terminal 200.

The data center 100 may include a center modem unit 110, a center memory 120, and a center controller 130. The data center 100 includes more components than the illustrated components. However, only components necessary for the present disclosure will be described.

The center modem unit 110 may communicate with a terminal modem unit 210. The center modem unit 110 may communicate with other mobile terminals.

The center memory 120 is controlled by the center controller 130. The center memory 120 may store necessary information related to a device that communicates with the data center 100. The center memory 120 may include at least one storage medium such as a flash memory, a hard disk, a solid state disk (SSD), a silicon disk drive (SDD), a multimedia card micro, a memory card (e.g., an SD or XD storage unit, etc.), a random access memory (RAM), a static random access memory (SRAM), a read-only memory (ROM), an electrically erasable programmable read-only memory (EEPROM), a programmable read-only memory (PROM), a magnetic storage unit, a magnetic disk, an optical disc, and the like. Even though the center memory 120 is described as a component of the data center 100, the center memory 120 may become a server that separately stores massive data at the time of implementation.

The center controller 130 may control an overall operation of the data center 100. Details will be described below.

Meanwhile, the telematics terminal 200 may include the terminal modem unit 210, a terminal location information receiver 220, a display 230, a terminal memory 240, and a terminal controller 250.

In the present specification, description is given on the assumption that the telematics terminal 200 includes the terminal modem unit 210 and the terminal location information receiver 220. However, at the time of implementation, the telematics terminal 200 may include the terminal location information receiver 220 separated from a telematics unit (not illustrated) including a modem. In this instance, the telematics unit may communicate with the terminal location information receiver 220 through in-vehicle communication (e.g., controller area network (CAN) communication).

In general, the telematics terminal 200 includes the display 230 which is disposed in a front part of the vehicle. In addition, the telematics terminal 200 provides audio, video, and navigation functions.

The terminal modem unit 210 may include at least one module that enables wireless communication between the telematics terminal 200 and a wireless communication system, between the telematics terminal 200 and another telematics terminal, or between the telematics terminal 200 and an external center. In addition, the terminal modem unit 210 may include at least one module that connects the telematics terminal 200 to one or more networks.

The terminal modem unit 210 may communicate with the data center 100. In general, the terminal modem unit 210 may communicate with the data center 100 using wireless communication. The terminal modem unit 210 may exchange a radio signal with at least one of a base station, an external terminal, and a center in a mobile communication network constructed according to technical standards or communication schemes for mobile communication (e.g., Global System for Mobile communication (GSM), Code Division Multiple Access (CDMA), Code Division Multiple Access 1000 (CDMA1000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), LTE-Advanced (LTE-A), etc.). The radio signal may include an audio call signal, a video call signal, or various forms of data according to exchange of a text/multimedia message.

The terminal location information receiver 220 is a component for acquiring a location (e.g., a current location) of the telematics terminal 200. For example, when the terminal location information receiver 220 of the telematics terminal 200 is used, it is possible to acquire a location of the telematics terminal 200 using a signal transmitted from a GPS satellite. Meanwhile, the telematics terminal 200 may support Wi-Fi, Bluetooth, Wi-Fi direct, etc.

The display 230 may include at least one of a liquid crystal display (LCD), a thin film transistor-liquid crystal display (TFT LCD), an organic light-emitting diode (OLED), a flexible display, a three-dimensional (3D) display, an e-ink display, and the like. The display 230 may include a touch sensor that detects a touch to the display 230 such that a control instruction can be input by touch. In this way, when the display 230 is touched, the touch sensor may detect the touch, and the terminal controller 250 may generate a control instruction corresponding to the touch based on the detection. A character or a digit, an instruction or an assignable menu item in various modes, etc. may be input by the touch scheme.

The terminal memory 240 stores data that supports various functions of the telematics terminal 200. The terminal memory 240 may store a plurality of applications executed by the telematics terminal 200, data for operation of the telematics terminal 200, and instructions. At least some of the applications may be downloaded from the external center through wireless communication. In addition, at least some of the applications may be present on the telematics terminal 200 from the time of release for a basic function of the telematics terminal 200. Further, an application may be stored in the terminal memory 240, installed on the telematics terminal 200, and executed such that an operation (or function) of the telematics terminal 200 is performed by the terminal controller 250.

The terminal memory 240 may store a program for operation of the terminal controller 250, and temporarily store input/output data. The terminal memory 240 may store data about vibration and sound having various patterns output in response to a touch input on a touchscreen. The terminal memory 240 may include at least one storage medium such as a flash memory, a hard disk, a solid state disk (SSD), a silicon disk drive (SDD), a multimedia card micro, a memory card (e.g., an SD or XD storage unit, etc.), a random access memory (RAM), a static random access memory (SRAM), a read-only memory (ROM), an electrically erasable programmable read-only memory (EEPROM), a programmable read-only memory (PROM), a magnetic storage unit, a magnetic disk, an optical disc, and the like. The telematics terminal 200 may be operated in connection with a web storage that performs a storage function of the terminal memory 240 over the Internet.

The terminal controller 250 controls overall operation of the telematics terminal 200 in addition to an operation related to the application. The terminal controller 250 may provide appropriate information or function to a user or process the information or functions by processing a signal, data, information, etc., input or output through the above-described components or by executing the application stored in the terminal memory 240. The terminal controller 250 may receive current location information of the telematics terminal 200 through the terminal location information receiver 220. The current location information may be received by the GPS.

A mobile terminal (not illustrated) may control the telematics terminal 200 through the data center 100. The mobile terminal may perform wireless communication with the data center 100. The mobile terminal may perform a control operation through the data center 100 such that the telematics terminal 200 performs remote starting, remote door locking/unlocking, parking location information collection, remote air conditioning, etc.

FIG. 2 illustrates a service discovery operation of a data service system according to embodiments of the present disclosure. The data service system may include the data center 100, the telematics terminal 200, and at least one electronic control unit (ECU), for example, a first ECU 300 and a second ECU 400.

In S210, the data center 100 transmits a service search instruction for searching for a service provided by a vehicle to the telematics terminal 200. The data center 100 may include a telematics center. Alternatively, the data center 100 may communicate with the telematics terminal 200 through the telematics center. Hereinafter, a description will be given on the assumption that the data center 100 has a function of the telematics center. Further, the data center 100 may collect vehicle breakdown information, driving information, modem information, signal information of an ECU installed in the vehicle, etc. The vehicle breakdown information may include a breakdown history, a regular inspection date, etc. of the vehicle. The driving information may include information about speed, temperature, etc. during vehicle driving. The modem information may include power, signal strength, etc. of a modem.

Subsequently, in S215, the telematics terminal 200 transmits, to a plurality of ECUs, information about whether a service requested from the data center 100 can be provided. The telematics terminal 200 may communicate with the plurality of ECUs through vehicle Ethernet. An Internet protocol (IP) address may be allocated to each of the telematics terminal 200 and the plurality of ECUs such that the telematics terminal 200 and the plurality of ECUs can communicate with each other. In this instance, big data may be transmitted.

In addition, the telematics terminal 200 may transmit a control signal to the plurality of ECUs through CAN communication depending on whether a corresponding service can be provided. For example, when the telematics center 100 transmits a service request for collection of particular information about a power train to the telematics terminal 200, the telematics terminal 200 may request that an ECU, which can provide the particular information about the power train, provide the service. The corresponding service is a data provision service, and may be a service for providing new data or updated data which can be provided by the at least one ECU installed in the vehicle.

Thereafter, when the first ECU 300 can provide the corresponding service, the first ECU 300 transmits a message indicating that the first ECU 300 can provide the service to the telematics terminal 200 in S220.

Then, when the telematics center 100 determines that there is information indicating that the corresponding service can be provided in S230, the telematics center 100 requests that the telematics terminal 200 register the corresponding service in S235.

On the other hand, when the telematics center 100 determines that there is no information indicating that the corresponding service can be provided in S230, the telematics center 100 may terminate a corresponding service registration procedure. When there is information indicating that the corresponding service can be provided, the telematics terminal 200 requests that the first ECU 300 register the corresponding service in S240.

Then, the first ECU 300 transmits a response to the service registration request to the telematics terminal 200 in S245. In this instance, the first ECU 300 may transmit a message indicating that the service can be provided to the telematics terminal 200.

Then, the telematics terminal 200 transmits a service provision message to the data center 100 in S250. When the service that the data center 100 requests the telematics terminal 200 to provide is a data transmission service, the data center 100 may restrict a data transmission period, the number of data transmissions, the amount of data, etc. In this case, the data center 100 may provide a service suitable for the telematics terminal 200. For example, when there is a problem in the speed of the vehicle, the data center 100 may frequently receive data related to the speed of the telematics terminal 200 to identify a cause of the problem, thereby properly dealing with the problem.

Thereafter, the first ECU 300 provides the corresponding service to the data center 100 in 5255 and 5260. Meanwhile, the data center 100 may wait for consent to provide the service from the telematics terminal 200. For example, when a vehicle passenger desires that the data center 100 provide a data collection service, the data center 100 may wait for consent to provide the service through the telematics terminal 200 or the mobile terminal.

As described above, when Ethernet communication is applied to an ECU in a vehicle, and a service discovery process is applied to a telematics system, it is possible to collect variable data and enhance dynamic extension. In addition, according to various embodiments of the present disclosure, when an additional service is needed, user convenience may be enhanced by providing the service without changing software of a component mounted in a vehicle. When software of a component mounted in a vehicle is not changed, device efficiency is enhanced, and cost reduction is expected. In addition, it is possible to construct a flexible network system for vehicle data analysis and enhance dynamic extension of a vehicle network.

Effects that may be obtained from the present disclosure are not limited to the above-mentioned effects, and other effects not mentioned herein may be clearly understood by those skilled in the art from the above description.

As described above, a data service system may use a requested service through the above-described service discovery scheme without updating a component mounted in a vehicle. According to the present disclosure, it is possible to overcome existing inconvenience of inevitably updating a component of a vehicle to receive a requested service, and a problem of incurred cost. Meanwhile, the above-described present disclosure may be implemented as computer-readable code in a medium storing a program. A computer-readable medium may include all types of recording units in which computer system-readable data is stored. Examples of the computer-readable medium include a hard disk drive (HDD), an SSD, an SDD, a ROM, a RAM, a CD-ROM, a magnetic tape, a floppy disk, an optical data storage device, etc. Further, a computer may include the terminal controller 250 of the telematics terminal 200.

Therefore, the above detailed description should be construed in all aspects as illustrative and not restrictive. The scope of the disclosure should be determined by the appended claims and their legal equivalents, and all changes coming within the equivalency range of the appended claims are to be embraced therein.

What is claimed is:

1. A data center comprising:
   a modem communicating with a telematics terminal equipped in a vehicle; and
   a controller i) controlling the modem to transmit a service search instruction to the telematics terminal to determine an availability of a specific service for collection of particular vehicle information provided by the vehicle, causing the telematics terminal to search for the specific service, ii) controlling the modem to receive information about whether the specific service is able to be provided from the telematics terminal, wherein the specific service is able to be provided only when an electronic control unit (ECU) equipped in the vehicle capable of providing the specific service is discovered by the telematics terminal using vehicle Ethernet communication via a service discovery procedure, iii) requesting that the telematics terminal execute the specific service when the specific service is able to be provided, and iv) receiving the particular vehicle information from the telematics terminal when the request is accepted by the telematics terminal,
   wherein the service discovery procedure comprises exchanging, between the telematics terminal and the ECU equipped in the vehicle, control signals to determine the availability of the specific service.

2. The data center according to claim 1, wherein the specific service is a data provision service.

3. The data center according to claim 2, wherein the data provision service is a service for providing new data or changed data to be provided by at least one electronic control unit (ECU) mounted in the vehicle.

4. The data center according to claim 1, wherein at least one of vehicle breakdown information, driving information, modem information, and ECU signal information is collected from the telematics terminal.

5. The data center according to claim 1, wherein the communication with the telematics terminal is performed through a mobile communication network.

6. The data center according to claim 1, wherein consent to provide the specific service is received from the telematics terminal.

7. A method of controlling a data center for communicating with a telematics terminal equipped in a vehicle, the method comprising:
   transmitting a service search instruction to the telematics terminal to determine an availability of a specific service for collection of particular vehicle information provided by the vehicle, causing the telematics terminal to search for the specific service;
   receiving, from the telematics terminal, information about whether the specific service is able to be provided, wherein the specific service is able to be provided only when an electronic control unit (ECU) equipped in the vehicle capable of providing the specific service is discovered by the telematics terminal using vehicle Ethernet communication via a service discovery procedure;
   requesting that the telematics terminal execute the specific service when the specific service is able to be provided; and
   receiving the particular vehicle information from the telematics terminal when the request is accepted by the telematics terminal,
   wherein the service discovery procedure comprises exchanging, between the telematics terminal and the ECU equipped in the vehicle, control signals to determine the availability of the specific service.

8. The method according to claim 7, further comprising:
   collecting, from the telematics terminal, at least one of vehicle breakdown information, driving information, modem information, and ECU signal information.

9. The method according to claim 7, wherein the specific service is a data provision service.

10. The method according to claim 9, wherein the data provision service is a service for providing changed data or new data to be provided by at least one electronic control unit (ECU) mounted in the vehicle.

11. The method according to claim 7, further comprising:
    receiving consent to provide the specific service from the telematics terminal.

12. A method of controlling a telematics terminal equipped in a vehicle, the method comprising:
    receiving a service search instruction from a data center to determine an availability of a specific service for collection of particular vehicle information provided by the vehicle;
    querying at least one electronic control unit (ECU) mounted in the vehicle to determine whether the specific service is able to be provided, wherein the specific service is able to be provided only when an ECU of the at least one ECU capable of providing the specific service is discovered by the telematics terminal using vehicle Ethernet communication via a service discovery procedure; and
    transmitting a response to the data center indicating that the specific service is able to be provided when the telematics terminal discovers the ECU capable of providing the specific service,
    wherein the service discovery procedure comprises exchanging, between the telematics terminal and the ECU equipped in the vehicle, control signals to determine the availability of the specific service.

13. The method according to claim 12, further comprising:
    transmitting a request for registration of the specific service to the ECU capable of providing the specific service when the request is received from the data center; and
    providing the specific service to the data center when the request for registration is accepted by the ECU capable of providing the specific service.

14. The method according to claim 12, wherein the querying of the at least one ECU comprises querying the at least one ECU to determine whether the specific service is to be provided through controller area network (CAN) communication with the at least one ECU.

15. A telematics terminal equipped in a vehicle comprising:
    a modem communicating with a data center; and
    a controller i) receiving a service search instruction from the data center through the modem to determine an availability of a specific service for collection of particular vehicle information provided by the vehicle, ii) querying at least one electronic control unit (ECU) mounted in the vehicle to determine whether the specific service is able to be provided, wherein the specific service is able to be provided only when an ECU of the at least one ECU capable of providing the specific service is discovered by the telematics terminal using vehicle Ethernet communication via a service discovery procedure, and iii) transmitting a response to the data center indicating that the specific service is able to be provided when the telematics terminal discovers the ECU capable of providing the specific service, wherein the service discovery procedure comprises exchanging, between the telematics terminal and the ECU equipped in the vehicle, control signals to determine the availability of the specific service.

16. The telematics terminal according to claim 15, wherein the controller transmits a request for registration of the specific service to the ECU capable of providing the specific service when the request is received from the data center, and provides the specific service to the data center when the request for registration is accepted by the ECU capable of providing the specific service.

17. The telematics terminal according to claim 15, wherein the controller queries the at least one ECU to determine whether the specific service is to be provided through CAN communication with the at least one ECU mounted in the vehicle.

18. A data service system comprising:
a telematics terminal equipped in a vehicle;
at least one electronic control unit (ECU) mounted in the vehicle communicating with the telematics terminal; and
a data center transmitting, to the telematics terminal, a service search instruction to determine an availability of a specific service for collection of particular vehicle information provided by the vehicle, wherein
the telematics terminal queries the at least one ECU to determine whether the specific service is able to be provided, wherein the specific service is able to be provided only when an ECU of the at least one ECU capable of providing the specific service is discovered by the telematics terminal using vehicle Ethernet communication via a service discovery procedure, and transmits a response to the data center indicating that the specific service is able to be provided when the telematics terminal discovers the ECU capable of providing the specific service, the data center requests via the telematics terminal that the ECU capable of providing the specific service execute the specific service when the response indicating that the specific service is able to be provided is received, and receives the particular vehicle information from the ECU capable of providing the specific service via the telematics terminal when the request is accepted by the telematics terminal, and the service discovery procedure comprises exchanging, between the telematics terminal and the ECU equipped in the vehicle, control signals to determine the availability of the specific service.

19. The data service system according to claim 18, wherein the specific service is a data provision service.

20. The data service system according to claim 19, wherein the data provision service is a service for providing new data or changed data to be provided by the at least one ECU.

* * * * *